United States Patent
Del Porto

(10) Patent No.: US 8,974,669 B2
(45) Date of Patent: Mar. 10, 2015

(54) THERMALLY ENHANCED INTEGRATED WASTEWATER TREATMENT SYSTEM

(75) Inventor: David Anthony Del Porto, East Sandwich, MA (US)

(73) Assignee: Ecocyclet LLC, Weaverville, NC (US)

( * ) Notice: Subject to any disclaimer, the term of this patent is extended or adjusted under 35 U.S.C. 154(b) by 569 days.

(21) Appl. No.: 13/342,123

(22) Filed: Jan. 2, 2012

(65) Prior Publication Data

US 2012/0168373 A1    Jul. 5, 2012

Related U.S. Application Data

(60) Provisional application No. 61/429,236, filed on Jan. 3, 2011.

(51) Int. Cl.
*C02F 11/04* (2006.01)
*C02F 3/12* (2006.01)
*C02F 103/00* (2006.01)
*C02F 103/20* (2006.01)
*C02F 103/22* (2006.01)

(52) U.S. Cl.
CPC .............. *C02F 3/1257* (2013.01); *C02F 11/04* (2013.01); *C02F 2103/005* (2013.01); *C02F 2103/20* (2013.01); *C02F 2103/22* (2013.01); *C02F 2209/001* (2013.01); *C02F 2209/02* (2013.01); *C02F 2303/10* (2013.01); *Y02E 50/343* (2013.01); *Y10S 210/903* (2013.01)
USPC ............ 210/603; 210/612; 210/614; 210/903

(58) Field of Classification Search
CPC .............. C02F 11/04; C02F 2103/005; C02F 2209/001; C02F 3/1257; C02F 2209/02; C02F 2303/10; C02F 2103/20; C02F 2103/22; Y02E 50/343
USPC ........ 210/603, 605, 612, 613, 614, 630, 903, 210/908, 170.03, 170.06, 175, 252, 259
See application file for complete search history.

(56) References Cited

U.S. PATENT DOCUMENTS

| | | | |
|---|---|---|---|
| 4,174,371 A | 11/1979 | Bell | |
| 4,246,099 A * | 1/1981 | Gould et al. | 210/603 |
| 4,750,454 A | 6/1988 | Santina | |
| 6,569,332 B2 | 5/2003 | Ainsworth | |
| 6,572,772 B2 | 6/2003 | Hoyt | |
| 6,613,562 B2 | 9/2003 | Dvorak | |
| 6,814,866 B1 | 11/2004 | Potts | |
| 7,005,068 B2 | 2/2006 | Hoffland | |
| 7,169,821 B2 | 1/2007 | Branson | |
| 7,468,133 B1 | 12/2008 | Norton | |
| 7,585,413 B2 | 9/2009 | Hoffland | |
| 7,828,938 B2 | 11/2010 | Bowman | |
| 2002/0096471 A1 | 7/2002 | Miller | |
| 2003/0038078 A1 | 2/2003 | Stamper | |
| 2004/0154982 A1 | 8/2004 | Irani | |
| 2005/0139546 A1 | 6/2005 | Burke | |
| 2007/0193948 A1 | 8/2007 | Livingston | |
| 2009/0173688 A1 | 7/2009 | Phillips | |
| 2010/0237015 A1 | 9/2010 | Voutchkov | |
| 2011/0023485 A1 * | 2/2011 | Schubert | 60/648 |
| 2011/0042307 A1 * | 2/2011 | VanOrnum et al. | 210/603 |

* cited by examiner

*Primary Examiner* — Fred Prince
(74) *Attorney, Agent, or Firm* — Lawrence Lambelet

(57) ABSTRACT

Novel methods and systems for efficient and economic treatment of wastewater, and other fluidized and solid organic wastes, comprise heating the aerobic digestion process with waste heat given off by the generation of power fueled by the biogas by-product of a co-located anaerobic digestion process. Other power generation processes may be utilized for supplying supplemental waste heat.

17 Claims, 4 Drawing Sheets

THERMALLY ENHANCED INTEGRATED WASTEWATER TREATMENT SYSTEM

CROSS-REFERENCE TO RELATED APPLICATIONS

This application claims priority to U.S. Provisional Application 61/429,236, filed Jan. 3, 2011.

FIELD OF THE INVENTION

This invention relates to wastewater treatment, and more particularly to the enhancement of aerobic biologic activity in said treatment.

BACKGROUND OF THE INVENTION

Throughout the history of wastewater treatment, the focus has been on improving pollutant removal primarily by biological processes. Biological processes rely on aerobic, anaerobic, and facultative microorganisms to transform the organic matter and other recognized pollutants to benign gasses and dissolved or suspended solids that can be safely dispersed into the ground or receiving waters. There are a number of biological technologies and processes that are available to meet pollutant elimination discharge limits, but all operate at the ambient temperature of the sewage influent presented for treatment.

The aerobic treatment of sewage, and other biological feed stocks, involves the metabolic breakdown of organic matter by microbes in the presence of free oxygen. This process takes place in a containment vessel, such as a tank or basin, hereinafter termed "lagoon". The lagoon is supplied with exogenous oxygen by submerged forced-air "bubblers" or by surface aerators. A noxious by-product of the metabolic breakdown, or digestion, is ammonia. When nitrosomonas bacteria are added in the presence of oxygen, the ammonia is converted to nitrite, which is then further transformed by oxidation to nitrate. The nitrate is ultimately consumed by facultative bacteria and turned into the beneficial gases of carbon dioxide ($CO_2$) and nitrogen ($N_2$) when the exogenous oxygen is depleted and the state of the lagoon turns from aerobic to anoxic.

The microbial action can be speeded by introducing heat. A known principle of metabolism, the $Q_{10}$ principle namely, states that, within normal biological limits, a 10° C. rise in temperature will double the biochemical rate of reaction. Heating sewage influent could lead to exponential increases in microbial growth rates in a lagoon used for the treatment of wastewater, particularly where seasonal temperatures can drop to 0° C., or below. Furthermore, this increase in temperature, in turn, could allow more wastewater to be treated in a given vessel volume. In municipal wastewater treatment, where the scale is large, this volume efficiency could have significant implications for operational costs, not to mention facility construction costs, and would reduce the facility footprint impacting land use. The problem, however, is the prohibitive cost of supplying the heat.

SUMMARY OF THE INVENTION

The novel solutions of the present invention propose to utilize recycled heat which is otherwise a waste product of another process or operation while insulating the lagoon of the aerobic process to efficiently use the heat through retention thereof. One process shedding waste heat is in the generation of electricity from biogas produced in the anaerobic digestion of an organic-matter-rich waste stream. In addition to the matter carried by sewage and septage, such a waste stream could come from agricultural processes and include animal manures and urea's, for example; another such stream could come from industrial processes and include fish processing by-products, as another example.

Another donor process for waste heat, commonly found among municipal utilities, is electric power generation. Co-locating additional waste streams or power generation facilities with existing or planned wastewater installations would enable energy recycling and lead to an efficiently-operating municipal plant, particularly where the energy supply and demand can be balanced. Such a scenario replicates nature's ecological design, wherein the output of every organism becomes the input of another, and all waste is somewhere consumed.

In the primary stage of polluted water treatment, clearwater and sludge components of the influent stream are separated in a clarifier. "Clearwater", for the purpose of definition herein, is a liquor having dissolved and/or suspended organic matter, but otherwise having no visible particulate. The sludge component comprises the balance of particulate matter, including a significant part of carbon-containing matter, said matter having been separated by gravity, mechanical, or chemical (as in flocculating agents) means in the clarifier. The sludge component can be further processed in an anaerobic digester where anaerobic microorganisms convert the carbonaceous material into, primarily, biogas. Biogas is comprised of about 60% methane gas ($CH_4$) and 40% carbon dioxide ($CO_2$). The biogas is combustible and can be used to fuel an engine driving a generator. Heat thrown off by the generator and the engine can be recovered to supply heat through a heat exchanger to the clearwater component influent to an insulated lagoon. The electricity generated can be used to operate system equipment, such as circulating pumps, mixers and aeration blowers. Excess electricity can be slaved off to the institutional electrical grid.

Municipal wastewater systems may vary widely in the amount of clearwater volume generated and, therefore, in the amount of heat energy required for optimal aerobic biologic activity. One reason for this is that some systems include storm drainage and other surface water run-off. Since additional volume requires additional heat, co-locating external power generation with the wastewater system would supplement the waste heat pool. Such a novel approach balances the energy equation and leads to an efficient system of treating sewage and other organic wastes for safe release back to the environment.

It is accordingly an object of the present invention to optimize the aerobic biologic activity in the treatment of wastewater by adding heat to the process. It is a further object to utilize otherwise wasted heat from co-located processes. It is a further object to protect the aerobic biologic activity from heat loss therein. It is a further object to recover and reuse heat from the discharge of the aerobic biologic activity. It is a further object to use co-located biogas production from the anaerobic digestion of organic waste to fuel a source of heat, either directly in combustion or as a by-product of electricity generation. It is a further object to gain efficiency in the treatment of organic wastes by amassing processes to utilize the by-product heats there from and turn any excess energy into the generation of electricity.

These objects, and others to become hereinafter apparent, are embodied in a method of economically enhancing lagoon treatment of wastewater, comprising the steps of providing an influent stream of at least partially organic waste matter; processing the influent stream in a clarifier to at least partially separate the stream into sludge and clearwater components; processing the sludge component in an anaerobic digester to produce a biogas which is at least partially methane gas; using the biogas as combustible fuel for an engine powering a generator to produce electricity, both engine and generator additionally producing by-product heat; capturing the by-product heat from the engine and generator to heat the clearwater component of the clarifier through a first heat exchanger; processing the heated clearwater into at least one lagoon wherein biologic action to de-nitrify and de-carbonize the clearwater is accelerated by the added heat; and discharging the de-nitrified and de-carbonized clearwater from the at least one lagoon to an environmentally-safe application.

In a preferred embodiment, the method further comprises the step of reclaiming the heat from the discharge of the lagoon to further heat the clearwater component of the clarifier through a second heat exchanger. In another aspect of the preferred embodiment, the lagoon is insulated to retain heat. In yet another aspect of the preferred embodiment, the method further comprises utilizing by-product heat from co-located power generation fueled by other than biogas.

As this is not intended to be an exhaustive recitation, other embodiments may be learned from practicing the invention or may otherwise become apparent to those skilled in the art.

DESCRIPTION OF THE DRAWINGS

Various other objects, features and attendant advantages of the present invention will become fully appreciated as the same becomes better understood through the accompanying drawings and the following detailed description, in which like reference characters designate the same or similar parts throughout the several views, and wherein.

DETAILED DESCRIPTION OF THE PREFERRED EMBODIMENT

Figure 1:
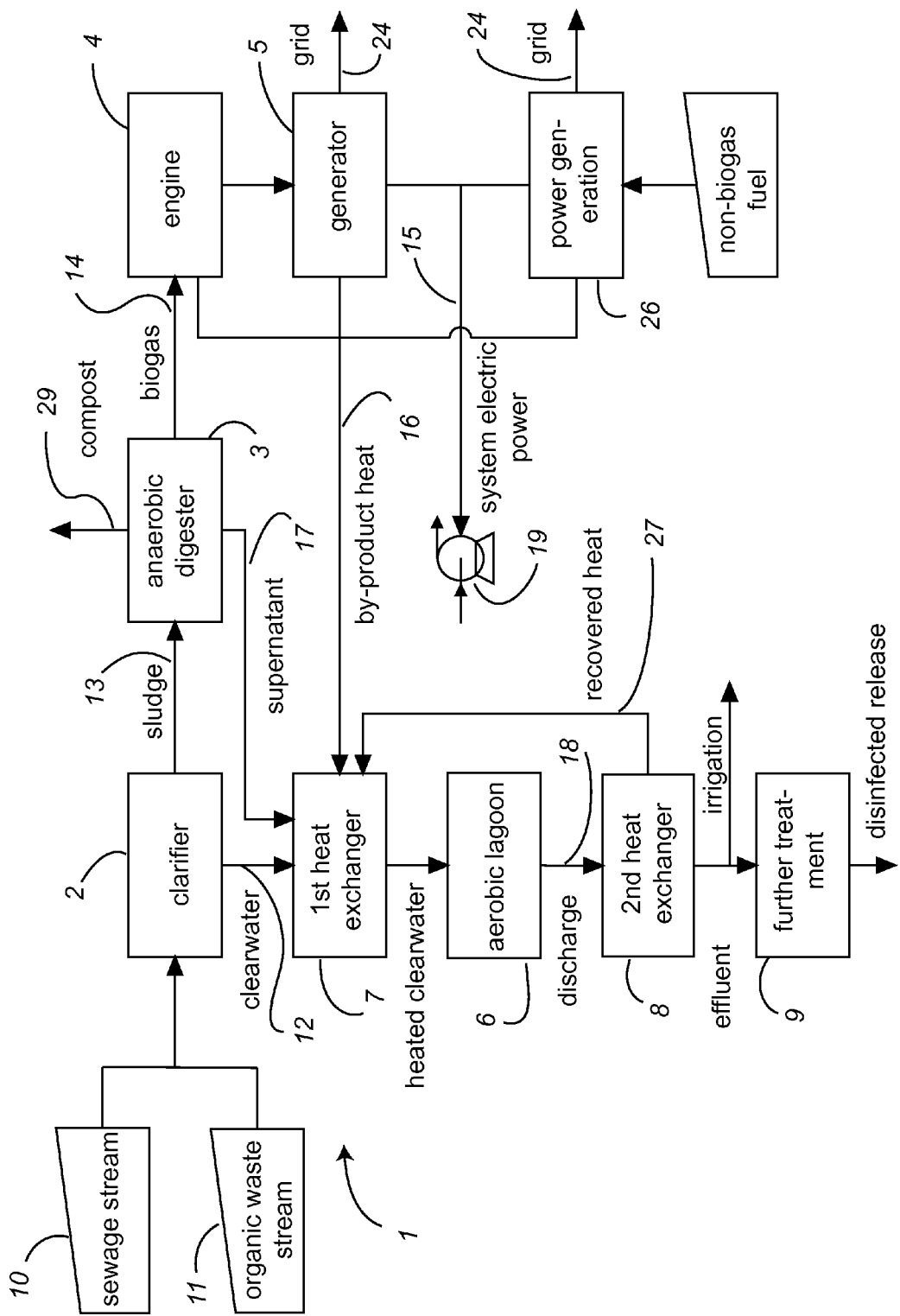
FIG. 1 is a system diagram of a thermally enhanced wastewater treatment system.

FIG. 1 illustrates a thermally-enhanced wastewater treatment system 1. The influent to the wastewater treatment system 1 comprises a sewage, and/or a septage, fluidized stream 10 combined with an auxiliary organic waste fluidized stream 11. The sewage stream 10 may include surface run-off or storm drainage. The organic stream 11 may be comprised of any organic wastes found in agricultural or industrial processes located nearby the treatment facility, or otherwise pumped or transported to the facility. Examples of such wastes are animal manures and urea's, fish processing by-products, municipal garbage, and collected yard wastes, such as grass clippings and leaves. The term "organic waste", as used herein, is not limited to these examples and is intended to include any pumpable stream of carbon-containing materials considered to be bio-degradable.

In a pre-treatment phase of the wastewater treatment system 1, large contaminant materials are removed, which would damage or clog the pumps and conduits, by screening, sieving, or raking. Examples of large contaminant materials include trash, sticks and uncomposted leaves. In the treatment phase, the influent is processed in a clarifier 2. The clarifier 2 separates particulate matter into a sludge 13, leaving a clearwater 12 liquor. Separation techniques may include settling or screening or may be assisted with flocculating agents to remove colloidal materials. The clearwater 12 may include dissolved or suspended organic matter, but is essentially free of visible particulate. The sludge 13 comprises, among other constituents, the organic-rich deposits from the influent stream.

The sludge 13 component of the influent stream is processed in an anaerobic digester 3. The anaerobic digester 3 may also be charged with dry solid waste from the feedstock's of organic waste 11 to further intensify the carbon content of the mixture. The anaerobic biologic activity in the anaerobic digester 3 produces biogas 14, which is at least partially methane gas ($CH_4$). Other metabolic by-products of the anaerobic digester 3 comprise hydrogen sulfide ($H_2S$) and organic acids. A supernatant 17 liquor results from additional separation of particulate in the digester, and further processing thereof would follow the processing path of clearwater 12. The supernatant 17 may be also be used without further processing as fertilizer. If the anaerobic digester 3 is covered, the biogas 14 may be captured and used for energy production. Biogas 14 is a combustible mixture, in spite of the fact that some fraction of it is comprised of non-combustible carbon dioxide ($CO_2$). The biomass and settlement from the anaerobic digester 3 may be removed and treated as compost 29, or may be used as soil conditioner.

The clearwater 12 component of the influent stream is processed in an aerobic lagoon 6. Aerobic microbes in the aerobic lagoon 6 de-carbonize the organic matter in an oxidation process, giving off ammonia ($NH_3$) as part of the microbial life cycle. Other bacteria in the aerobic lagoon 6 de-nitrify the ammonia and produce a benign nitrogen gas ($N_2$) by-product. The infusion of, or exclusion of, exogenous oxygen ($O_2$) into the aerobic lagoon 6 by submerged bubblers or by surface aerators control the growth of the specific microorganisms for aerobic de-carbonization and anoxic (absence of $O_2$) de-nitrification phases of the metabolic decomposition of the organic matter. These phases may be separated in more than one lagoon 6.

The biological oxidation process operates in a temperature range of approximately 0-40° C., with an optimal temperature of about 32-35° C. Because overheating presents a risk of killing the microbes, the preferred embodiment includes a temperature sensor 28 (not shown) in the aerobic lagoon 6 configuration. The temperature sensor 28 is in signal communication with a heat control mechanism 23 (not shown), such as a by-pass valve in a by-pass circuit.

As mentioned in the discussion above, the $Q_{10}$ principle stipulates that heating dramatically increases the growth rate of microorganisms. In the preferred embodiment, the heat is produced through the combustion of biogas 14, either directly in a furnace 25 (not shown), or as by-product heat 16 from power generation. In one aspect of the preferred embodiment, a combustion engine 4 produces mechanical power to drive a generator 5 producing electricity 15. The by-product heat 16 may comprise exhaust heat, friction heat or both. In another aspect of the preferred embodiment, the by-product heat 16 is supplemented with scavenged waste heat from a co-located power generation source 26 fueled by other than biogas 14. Power generation source 26 may generate heat, electrical, mechanical or nuclear power. Utilizing waste heat to economically and efficiently treat the clearwater 12 component is one of the novel solutions presented herein.

The clearwater 12 is heated by by-product heat 16 in a first heat exchanger 7. The heated effluent there from is treated in aerobic lagoon 6. In the preferred embodiment, the discharge 18 from the aerobic lagoon 6 is processed in a second heat exchanger 8 to recover any residual heat. Both the first heat exchanger 7 and the second heat exchanger 8 are provided with clean-out capability. The recovered heat 27 is returned to the first heat exchanger 7 to further supplement the by-product heat 16. The preferred system efficiently utilizes all heat generated from within the system, turning any excess energy from the combustion of biogas 14 into electricity 15. In the preferred embodiment, a component of electricity 15 can be utilized to power system equipment 19, such as circulatory pumps and aeration blowers. Excess electricity 15 can be sold to the commercial grid 24. The novel solutions presented by the present invention make the system, as a whole, at minimum, energy neutral. That is to say, any unfulfilled need for by-product heat 16 to efficiently heat aerobic lagoon 6, and any unfulfilled need for electricity 15 to power the system equipment 19, is supplied by additional power generation 26, any residual power there from ultimately generating revenue for the enterprise.

Figure 4:
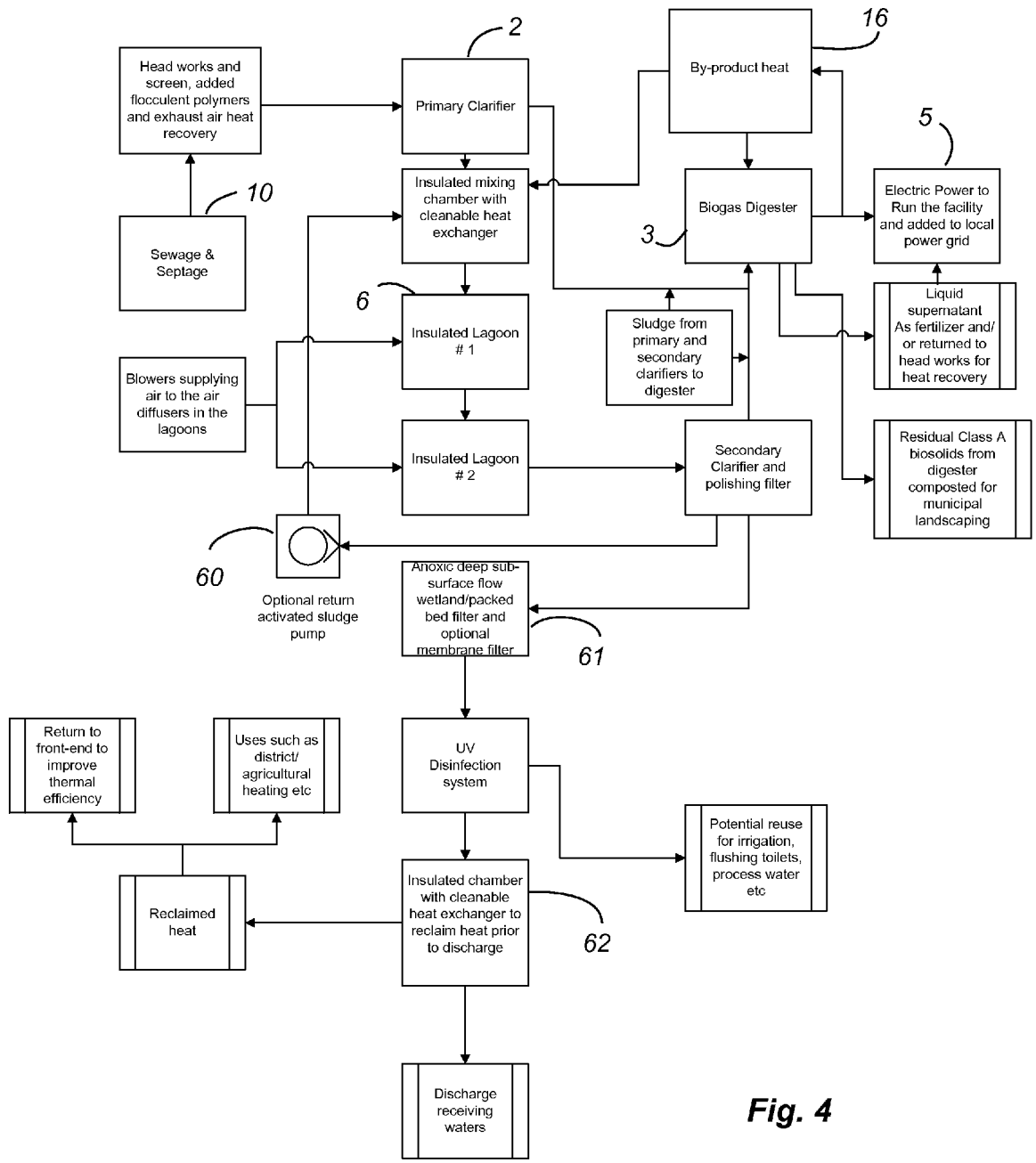
FIG. 4 is a system diagram of a complex system for treating sewage and septage.

The treated and cooled effluent from the second heat exchanger 8 may be used for non-sanitary purposes, such as for irrigation or for flushing livestock excrement. Said effluent may also be processed in further treatment 9 for other purposes. Some of the processes in further treatment 9 are shown in FIG. 4, where additional system complexity is illustrated. For example, further treatment 9 might include returning activated sludge 60 to the lagoon or digester, feeding additional digestion in a constructed wetland 61, or disinfecting the effluent 62 prior to release to receiving waters.

Figure 2:
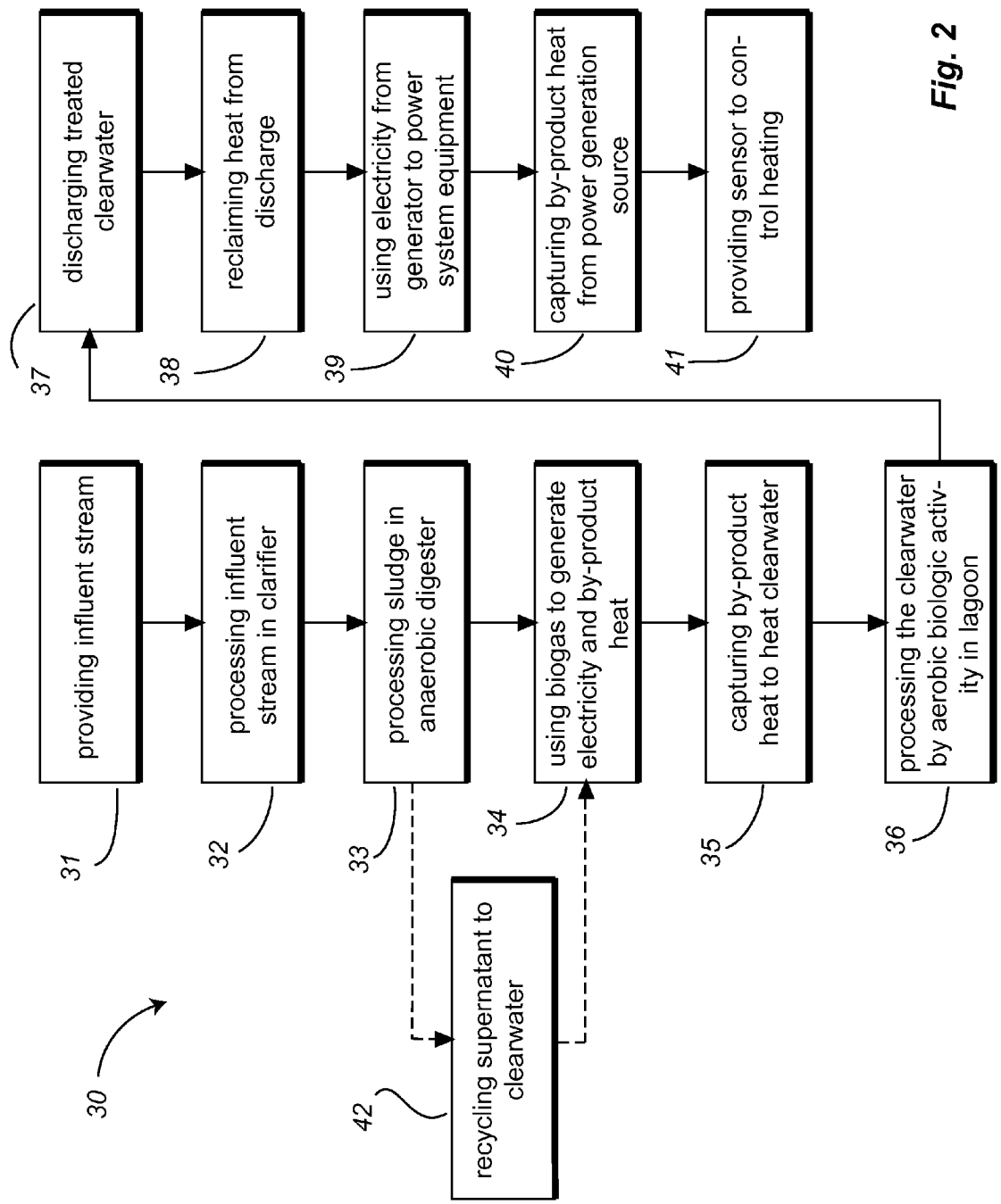
FIG. 2 is a process diagram of a method of enhancing lagoon treatment.

In the preferred embodiment, as shown in FIG. 2, a method of economically enhancing lagoon treatment of wastewater 30 comprises the following steps:
  a) providing 31 an influent stream of at least partially organic waste matter;
  b) processing 32 the influent stream in the clarifier 2 to at least partially separate the stream into sludge 13 and clearwater 12 components;
  c) processing 33 the sludge 13 component in an anaerobic digester 3 to produce the biogas 14 which is at least partially methane gas;
  d) using 34 the biogas 14 as combustible fuel for the engine 4 powering the generator 5 to produce electricity 15, both engine 4 and generator 5 additionally producing by-product heat 16;
  e) capturing 35 the by-product heat 16 from the engine 4 and the generator 5 to heat the clearwater 12 component of the clarifier 2 through the first heat exchanger 7;
  f) processing 36 the heated clearwater 12 into at least one lagoon 6 wherein biologic action to de-nitrify and de-carbonize the clearwater 12 is accelerated by the added heat; and
  g) discharging 37 the de-nitrified and de-carbonized clearwater 12 from the at least one lagoon 6 to an environmentally-safe application.

Figure 3:
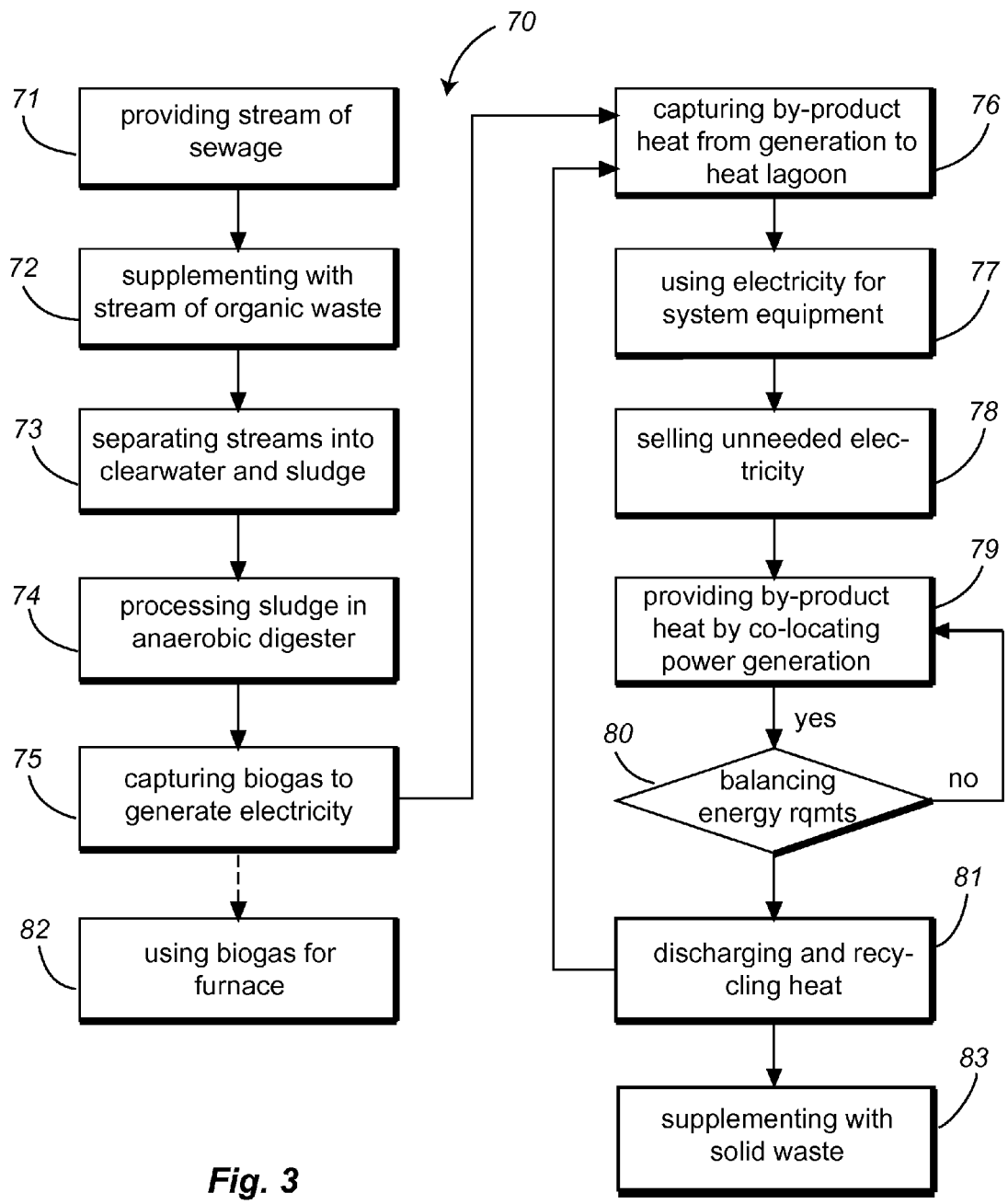
FIG. 3 is a process diagram of a method for efficiently treating organic wastes.

In another aspect of the preferred embodiment, the method of economically enhancing lagoon treatment of wastewater 30 further comprises the steps as follows:
  h) reclaiming 38 the heat 27 from the discharge 18 of the lagoon 6 to further heat the clearwater 12 component of the clarifier 2 through a second heat exchanger 8;
  i) using 39 at least a portion of the electricity 15 output of the generator 5 to power circulatory equipment 19 for the system comprised of clarifier 2, anaerobic digester 3, lagoon 6 and heat exchanger 7;
  j) capturing 40 the by-product heat 16 from a source fueled from other than biogas 14, such as power generation source 26, to supplement heat in the first heat exchanger 7;
  k) providing 41 the at least one sensor 28 to monitor temperature in the lagoon 6 and a heat control apparatus 23 in signal communication with the at least one sensor 28 to control heating in the lagoon 6 for optimal biological effect; and
  l) recycling 42, in the step of processing 33, the supernatant 17 from the anaerobic digester 3 to join the clearwater 12 stream In an alternate embodiment, as shown in FIG. 3, a method for efficiently treating is community organic waste 70, comprises the following steps:
  a) providing 71 the stream of municipal sewage 10 for processing in a treatment facility having the lagoon 6;
  b) supplementing 72 the stream of municipal sewage 10 with at least one other stream of fluidized organic waste 11;
  c) separating 73 each stream into the clearwater 12 and the sludge 13 components;
  d) processing 74 the sludge 13 component in the anaerobic digester 3 to produce the biogas 14;
  e) capturing and using 75 the biogas 14 to generate the electricity 15;
  f) capturing 76 the by-product heat 16 from the electricity 15 generation to heat the clearwater 12 component for optimal aerobic biologic activity in the lagoon 6;
  g) using 77 at least a portion of the electricity 15 to operate the equipment 19 in the treatment facility;
  h) selling 78 unneeded electricity 15 to the commercial electric grid 24;
  i) providing 79 additional by-product heat 16 by co-locating a power generation 26 facility with the treatment facility; and
  j) balancing 80 the energy requirements for efficient biologic activity by selectively using by-product heats 16.

In another aspect of the alternate embodiment, the method for efficiently treating community organic waste 70 further comprises the following steps:
  k) discharging 81 the treated clearwater 12 from the lagoon 6 for irrigation use or for further processing 9, and capturing and recycling heat 27 from the discharge 18; and
  l) using 82, in the step of capturing and using 75, at least a portion of the biogas 14 to fuel a furnace 25 generating heat from which at least a portion thereof is used to heat the clearwater 6.
  m) supplementing 83 the stream of municipal sewage 10 with at least one other stream of solid organic waste 11.

It is to be understood that the invention is not limited in its application to the details of construction, to the arrangements of the components or to the manipulative steps set forth in the preceding description or illustrated in the drawings. For example, the anoxic phase of the aerobic digestion cycle may occur, not in aerobic lagoon 6, but in deep subsurface flow to a wetland. Also, it is to be understood that the phraseology and terminology employed herein are for the purpose of the description and should not be regarded as limiting.

What is claimed is:

1. A method of economically enhancing lagoon treatment of wastewater, comprising the steps:
  providing an influent stream of at least partially organic waste matter;
  processing the influent stream in a clarifier to at least partially separate the stream into sludge and clearwater components;
  processing the sludge component in an anaerobic digester to produce a biogas which is at least partially methane gas;

using the biogas as combustible fuel for an engine powering a generator to produce electricity, both engine and generator additionally producing by-product heat;

capturing the by-product heat from the engine and generator to heat the clearwater component of the clarifier through a first heat exchanger;

processing subsequently the heated clearwater component from the previous processing, using and capturing steps into at least one lagoon wherein biologic action to de-nitrify and de-carbonize the clearwater is accelerated by the added heat; and discharging the de-nitrified and de-carbonized clearwater from the at least one lagoon to an environmentally-safe application.

2. The method of claim 1, further comprising the step of reclaiming the heat from the discharge of the lagoon to further heat the clearwater component of the clarifier through a second heat exchanger.

3. The method of claim 1, further comprising the step of using at least a portion of the electricity output of the generator to power circulatory equipment for the system comprised of clarifier, anaerobic digester, lagoon and heat exchanger.

4. The method of claim 1, further comprising the step of capturing by-product heat from a source fueled from other than biogas to supplement heat in the first heat exchanger.

5. The method of claim 4, wherein the source fueled from other than biogas comprises co-located power generation.

6. The method of claim 1, wherein the lagoon is insulated to retain heat.

7. The method of claim 1, further comprising the step of providing at least one sensor to monitor temperature in the lagoon and a heat control apparatus in signal communication with the at least one sensor to control heating in the lagoon for optimal biological effect.

8. The method of claim 1, wherein the influent stream is from a fluidized source selected from the group consisting of sewage, septage, animal manures and urea's, fish processing byproducts, municipal garbage and yard waste.

9. The method of claim 2, wherein the first and second heat exchangers render access for cleaning.

10. The method of claim 1, wherein the step of processing the sludge component in the digester further comprises recycling the supernatant there from to join the clearwater stream.

11. A method for efficiently treating community organic waste, comprising the steps:
providing a stream of municipal sewage for processing in a treatment facility having a lagoon;
supplementing the stream of municipal sewage with at least one other stream of fluidized organic waste;
separating each stream into clearwater and sludge components;
processing the sludge component in an anaerobic digester to produce biogas;
capturing and using the biogas to generate electricity;
capturing the by-product heat from the electricity generation to heat subsequently the clearwater component from the previous separating and capturing steps for optimal aerobic biologic activity in the lagoon by discharge of the heated clearwater component into the lagoon;
using at least a portion of the electricity to operate equipment in the treatment facility;
selling unneeded electricity to the commercial electrical grid;
providing additional by-product heat by co-locating a power generation facility with the treatment facility; and
balancing the energy requirements for efficient biologic activity by selectively using by-product heats.

12. The method of claim 11, wherein the step of supplementing the stream of municipal sewage comprises fluidized organic wastes from at least one of animal manures and urea's, fish processing byproducts, municipal garbage and yard waste.

13. The method of claim 11, further comprising discharging the treated clearwater from the lagoon for irrigation use or for further processing.

14. The method of claim 13, wherein heat from the discharge is captured and recycled.

15. The method of claim 11, wherein the step of capturing and using the biogas further comprises using at least a portion of the biogas to fuel a furnace generating heat from which at least a portion thereof is used to heat the clearwater.

16. The method of claim 11, further comprising supplementing the stream of municipal sewage with at least one other stream of solid organic waste.

17. A method of economically enhancing lagoon treatment of wastewater, comprising the steps:
providing an influent stream of at least partially organic waste matter;
processing the influent stream in a clarifier to at least partially separate the stream into sludge and clearwater components;
processing the sludge component in an anaerobic digester to produce a biogas which is at least partially methane gas;
using the biogas as combustible fuel for an engine powering a generator to produce electricity, both engine and generator additionally producing by-product heat;
capturing the by-product heat from the engine and generator to heat the clearwater component of the clarifier through a first heat exchanger;
processing subsequently the heated clearwater component from the previous processing, using and capturing steps into at least one lagoon wherein biologic action to de-nitrify and de-carbonize the clearwater is accelerated by the added heat;
discharging the de-nitrified and de-carbonized clearwater from the at least one lagoon to an environmentally-safe application; and
reclaiming the heat from the discharge of the lagoon to further heat the clearwater component of the clarifier through a second heat exchanger.

* * * * *